(12) United States Patent
Marino et al.

(10) Patent No.: US 6,721,283 B1
(45) Date of Patent: Apr. 13, 2004

(54) METHOD AND APPARATUS FOR A PLUG AND PLAY POLLING LOOP SYSTEM

(75) Inventors: Francis C. Marino, Dix Hills, NY (US); Jon C. Bruns, Central Islip, NY (US)

(73) Assignee: Honeywell International, Inc., Morristown, NJ (US)

( * ) Notice: Subject to any disclaimer, the term of this patent is extended or adjusted under 35 U.S.C. 154(b) by 8 days.

(21) Appl. No.: 10/269,416

(22) Filed: Oct. 11, 2002

(51) Int. Cl.⁷ .............................................. G01R 31/08
(52) U.S. Cl. ...................... 370/252; 370/449; 709/223
(58) Field of Search ................ 370/249, 247, 370/252, 254, 257, 258, 241, 248, 389, 403–5, 406–7, 449, 452, 460, 463, 475; 709/223, 224, 251, 252–3; 710/100–104, 109; 345/733–36

(56) References Cited

U.S. PATENT DOCUMENTS

| | | | |
|---|---|---|---|
| 5,347,515 A | | 9/1994 | Marino |
| 5,584,050 A | * | 12/1996 | Lyons ...................... 455/2.01 |
| 5,787,306 A | * | 7/1998 | Michael ........................ 710/9 |
| 5,977,913 A | * | 11/1999 | Christ ........................ 342/465 |

* cited by examiner

*Primary Examiner*—David Vincent
(74) *Attorney, Agent, or Firm*—Scully, Scott, Murphy & Presser

(57) ABSTRACT

A polling loop system provides all products to be prewired to the polling loop by technically unskilled labor followed by a plug and play enrollment process. The system combines the advantages of DIP switch zone addressing with smart serial number (S/N) addressing, which simplifies installation and replacement requirements. The system is fully backward compatible and is intended for a next generation of commercial polling loop systems.

22 Claims, 5 Drawing Sheets

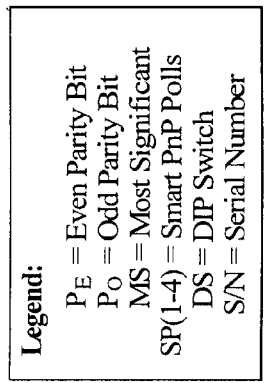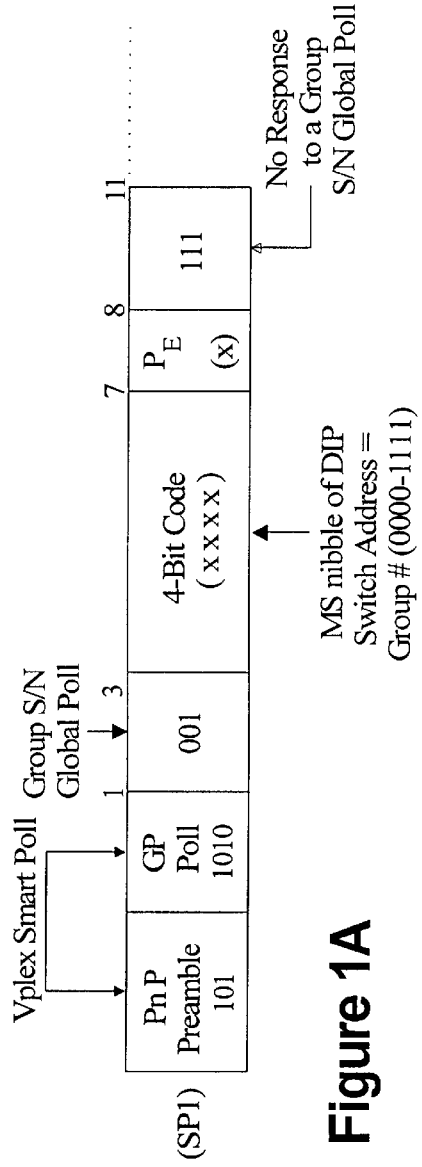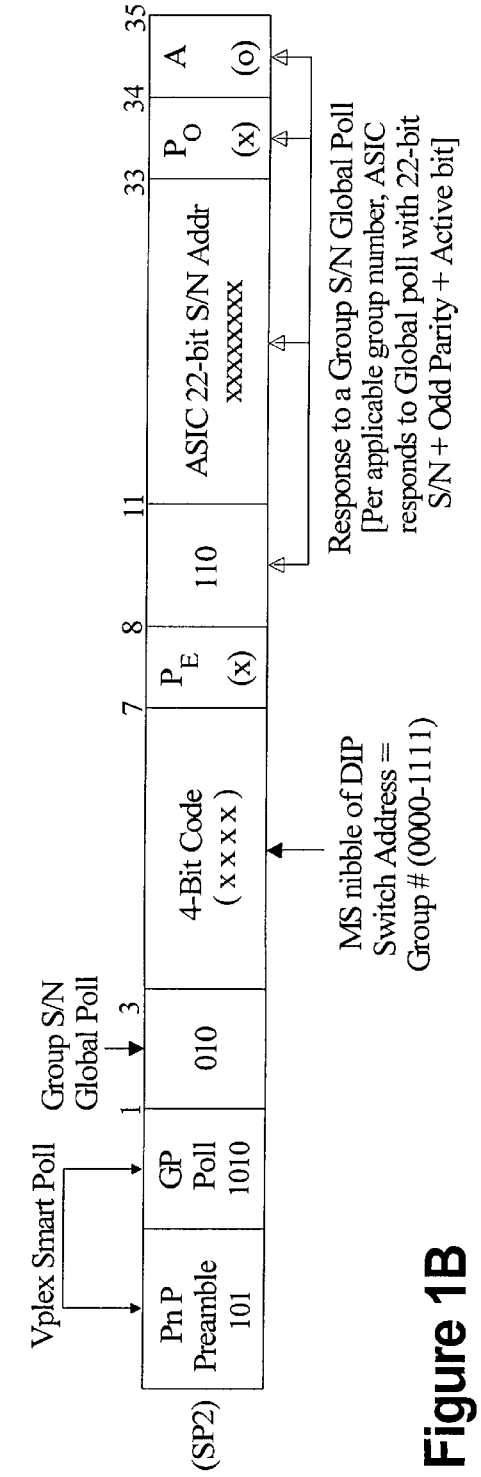
Figure 1A
Figure 1B

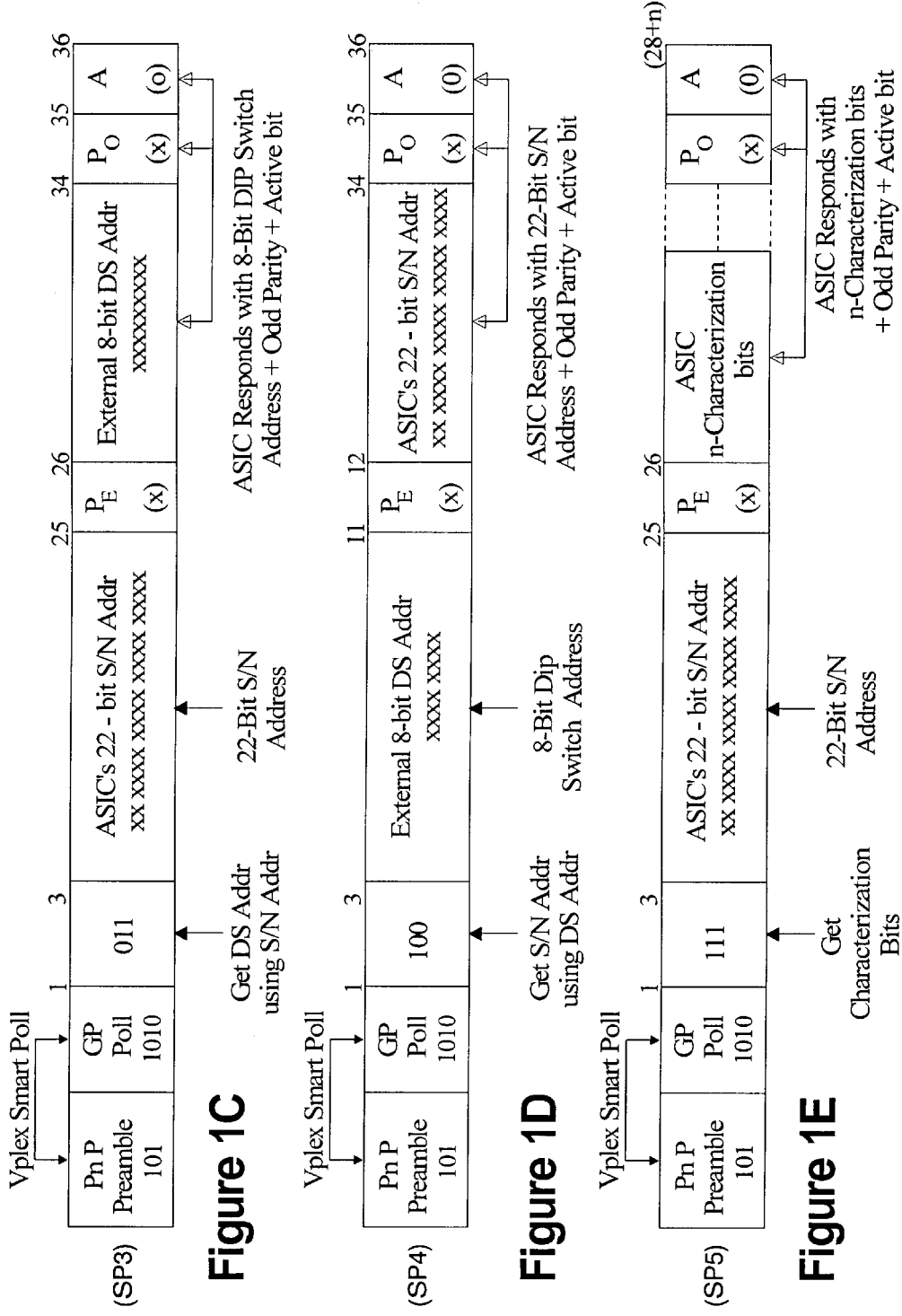

| Zn# | S/N | DS # | IN0 | IN1 | IN2 (Tamper) | IN3 | OUT0 | OUT1 | PID |
|---|---|---|---|---|---|---|---|---|---|
| 01-0 | A1234567 | 01 | XX | - | X | | | | 010 2-In |
| 01-1 | A1234567 | 01 | - | X | X | | | | 010 2-In |
| 02-0 | A4567890 | 02 | XX | - | X | - | - | - | 011 In/Out |
| 02-1 | A4567890 | 02 | - | X | X | - | - | - | 011 In/Out |
| 02-4 | A4567890 | 02 | - | - | X | - | X | - | 011 In/Out |
| 02-5 | A4567890 | 02 | - | - | X | - | - | X | 011 In/Out |
| 03-0 | A7891234 | 03 | XX | X | X | X | | | 10x I-In |
| 04-0 | A1112222 | 04 | XX | X | X | X | X | X | 00x Smk Det |

- 010 2-In rows: 2-Input Product
- 011 In/Out rows: Multiple Input/Output Product
- 10x I-In: 1-Input Product
- 00x Smk Det: Fire Detector Product with Variable Status

Figure 2A

|  |  |  |  |  |  |  |  |  |  |
|---|---|---|---|---|---|---|---|---|---|
| 05-0 | A222 3333 | 05 | XX | - | - | X | - | - | - | 11x Mot Det |
| 05-1 | A222 3333 | 05 | - | X | - | X | - | - | - | 11x Mot Det |
| 06-4 | A444 5555 | 06 | - | - | - | X | - | X | - | 011 In/Out |
| 07-0 | A555 6666 | 07 | XX | - | - | X | - | - | - | 10x |
| 07-1 | A555 6666 | 07 | - | X | - | X | - | - | - | 10x |
| 07-3 | A555 6666 | 07 | - | - | - | X | X | - | - | 10x |
| - | - | - | - | - | - | - | - | - | - | - |
| FE-0 | A789 1234 | FE | XX | - | - | X | - | - | - | 011 In/Out |
| FE-5 | A789 1234 | FE | - | - | - | X | - | - | X | 011 In/Out |

Figure 2B

METHOD AND APPARATUS FOR A PLUG AND PLAY POLLING LOOP SYSTEM

BACKGROUND OF THE INVENTION

The present invention relates generally to a method and apparatus for a plug and play registration system for each sensor product serial number and DIP switch number in a polling loop system, and more particularly pertains to a new Vplex polling loop system wherein all Vplex sensor products on the Vplex polling loop are pre-wired by technically unskilled labor, followed by a truly plug and play enrollment process for each sensor product serial number and DIP switch number. The system combines the advantages of DIP switch zone addressing with the advantages of smart serial number (S/N) addressing to simplify installation and replacement requirements. The system is fully backward compatible and is intended for the next generation of commercial Vplex systems.

Present commercial polling systems in the security systems market use either DIP switches alone, or random serial numbers alone, to uniquely address each of a variety of sensors in protected areas, or zones, of the system. None of the known systems, using either addressing method alone, solves a long desired goal of installing and prewiring all of the sensors in the system by technically unskilled labor, and subsequently enrolling data on each sensor automatically into the database of an associated commercial control. The present invention accomplishes that goal for the first time by providing sensors which employ both DIP switches and specially-configured serial numbers for each sensor in combination with unique polling protocols.

Some present commercial security systems use sensors made with a family of ASICs, and employ a tri-level baseband polling system (named "Vplex") which includes a feature described as global polling with contention-based address identification, as disclosed in U.S. Pat. No. 5,347,515. The ASIC specification includes a variety of new and backward-compatible polling protocols. Among the new protocols are those providing for Plug and Play (PnP) serial number (S/N) addressing, 8-bit alias zone addressing, group supervision polling, and protective loop diagnostics. The later two features are explained in patent application Ser. Nos. 09/861,129 and 09/996,492, respectively.

Vplex Polling Loop System Background

The use of in-circuit EEPROM ($E^2$) programming in a new Vplex family of products allows a 22-bit S/N address to be sequentially assigned and controlled by the supplier of the present Vplex ASIC specifications. To facilitate the enrollment process, each Vplex product contains one or more labels revealing the S/N address in 7-digit decimal notation. These labels are printed and affixed to each product during final test and assembly in factories after reading the S/N which is prestored in the product's ASIC.

Previous to the introduction of a prefabricated unique S/N per ASIC, Vplex products used ASICs which derived the address, or zone number, of the associated product from an 8-position DIP switch located physically on each product which could physically accommodate the DIP switch. Smaller products, which could not physically accommodate an 8-position DIP switch, utilized a special ASIC with 8 programmable bits of $E^2$. A hand-held programmer was developed and sold to installers to enable them to program the 8-bit address into the product's 8-bit $E^2$.

Actual field experience reported from a variety of installers over the past several years has resulted in a better understanding of the likes and dislikes of installers regarding the use of DIP switch addressing vs the use of predetermined S/Ns with identifying address labels. Each addressing method has specific advantages and disadvantages based on the manner in which many installers prefer to install and repair the polling loop systems.

DIP Switch Vs. S/N Addressing

In systems using DIP switch addressing, an 8-position DIP switch is set to the system zone number (derived from a 0-255 address table contained in the product's II). The installer must subsequently enter the system control's programming mode via a control keypad and enter that zone number in addition to associated information such as the zone response type, partition number, report code, and input type. This additional information is required by the security control to properly process activations from that device.

In systems using the present prerecorded S/Ns, the installer must enroll the product by first entering the control's programming mode using one of the system keypads. The required zone number is then entered followed by the same type of information listed previously for the DIP switch system. In this case, however, the enrollment process must include the addition of the unique pre-installed S/N which, at the appropriate point in the programming process, may be entered manually by keying in the 7-digit decimal address on the product's label. Alternatively the S/N may be entered by activating the product while connected to the polling loop in order for the control to automatically read the product's S/N via use of the Vplex global polling feature.

The keyboard entry process is subject to transcription errors and some products, such as motion, shock, and glass break detectors, must be activated in the proper manner and sequence in order for the control to recover the correct S/N for that product using the Vplex global polling feature of U.S. Pat. No. 5,347,515. This is one reason why some installation companies prefer to manually enter the product's S/N from the 7-digit label physically affixed to each product despite the propensity of making transcription errors.

The use of DIP switches for establishing the zone number simplifies defective unit replacement since all that is required is to duplicate the defective unit's DIP switch settings onto the DIP switch of the replacement unit. The disadvantages of DIP switch zone addressing are the cost and size of the DIP switch and the difficulty of subsequently locating duplicate addresses.

Neither the DIP switch method nor the S/N addressing method facilitates the ability of first, prewiring the complete system with unskilled labor, and secondly, completely enrolling all data via an installer-friendly procedure at the keypad.

BRIEF SUMMARY OF THE INVENTION

The present invention relates generally to a method and apparatus for a plug and play registration system for each sensor product serial number and DIP switch number in a polling loop system, and more particularly pertains to a new Vplex polling loop system wherein all Vplex sensor products on the Vplex polling loop are prewired by technically unskilled labor, followed by a truly plug and play enrollment process. The system combines the advantages of DIP switch zone addressing with the advantages of smart serial number (S/N) addressing to simplify installation and replacement requirements. The system is fully backward compatible and is intended for the next generation of commercial Vplex systems.

The present invention also provides a new S/N group global polling protocol which, in conjunction with the use of DIP switch sensor addressing, applies the principle of global polling of U.S. Pat. No. 5,347,515 in predetermined groups of 16 sensor products, or another number, that can be electronically handled without overloading the polling loop drive circuits, independent of the number of sensors that may be connected to the loop. The end result is a true plug and play polling loop registration system not available in any other low cost, low baud rate, 2-wire, polling loop security system.

BRIEF DESCRIPTION OF THE DRAWINGS

FIG. 1 illustrates exemplary Vplex plug and play smart polling protocols SP1–SP5.

FIG. 2 illustrates an exemplary Vplex sample plug and play database table.

DETAILED DESCRIPTION OF THE INVENTION

Figure 3:
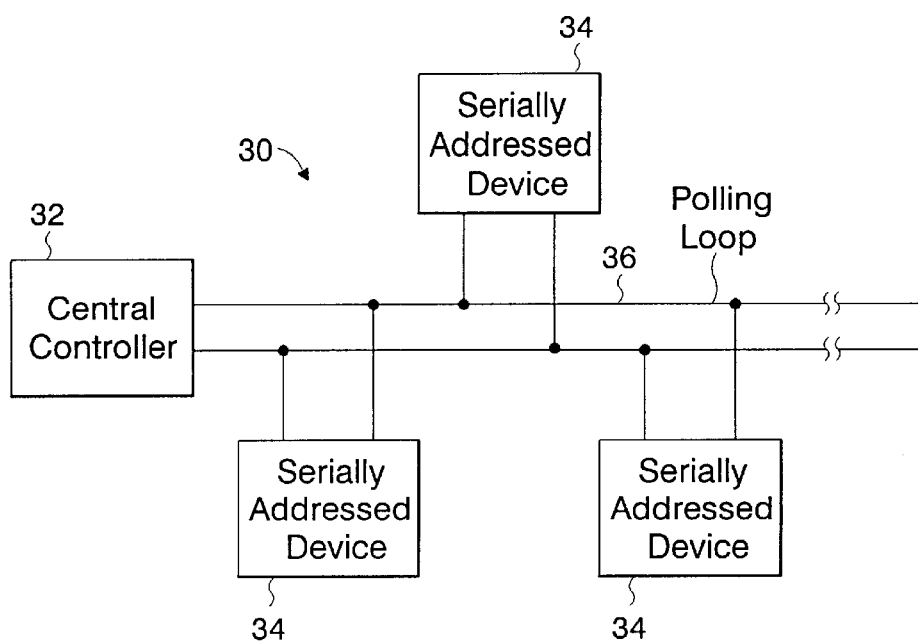
FIG. 3 illustrates a plurality of serially addressable devices coupled to an exemplary polling loop with a central controller which can use the present invention.

The present invention adds an 8-bit DIP switch to every sensor product which is used to set the address of the associated protected area, or zone, from information presented on a site plan of the security system. It also includes five (5) new polling protocols, illustrated in FIG. 1, which the security control employs to acquire the zone and unique S/N of every sensor into its database in a truly plug and play registration operation. The procedure is a three (3) step process as follows:

Step 1: The total of all of the system's products are prewired to the polling loop by technically unskilled labor. During this installation the basic zone *number of each device, which is derived from a pre-established site plan, is set by the person installing the device using the 8-bit DIP switch per product.

To simplify the DIP switch setting, the 8-position DIP switch can be divided into two 4-bit sections comprising two nibbles of a Hex code per zone number. In this way the product requires only a single 16-row address table, as illustrated in FIG. 2, which can be referred to for each hex code position comprising the zone number in Hex from 00 -FE.

FIG. 1 illustrates exemplary Vplex plug and play smart polling protocols SP1–SP5. Each of the smart protocols SP1–SP5 includes a PnP preamble 101 of three bits, and a post preamble GP poll 1010 of four bits, which identifies the poll as a Vplex smart poll, as distinguished from other polls. These first seven bits are identical for all smart protocols SP1 through SP5, and identify the poll as a Vplex smart poll. Referring to smart protocols SP1 through SP5, the first seven bits are followed by three bits which identifies each particular Vplex smart poll. Thus, smart polling protocol SP1 for a group S/N global poll with no response has identifier bits 001, smart polling protocol SP2 for a group S/N global poll with a response has identifier bits 010, smart polling protocol SP3 to get the dip switch (DS) address using the serial number (S/N) address has identifier bits 011, smart polling protocol SP4 to get the serial number (SIN) address using the dip switch (DS) address has identifier bits 100, and smart polling protocol SP5 to get the characterization bits has identifier bits 111.

Referring to smart polling protocols SP1 and SP2, the three identifier bits are followed by a 4 bit code of the most significant nibble of the DIP switch address (0000-1111). The 4-bit code is followed by an even parity bit PE, which is an error check bit.

Referring to smart polling protocol SP1, the even parity bit PE is followed by three bits 111 indicating no response to a group S/N global poll.

Referring to smart polling protocol SP2, the even parity check bit PE is followed by three bits 110, indicating a response to a group S/N global poll, followed by data on the ASIC 22 bit S/N address, followed by an odd parity bit PO which is an error check bit, followed by an activity bit A, which goes to zero (0) as an indication of activity from the addressed ASIC independent of the parity checking.

Referring to smart polling protocol SP3, the identifier bits 011 are followed by the ASIC 22 bit S/N address, followed by an even parity bit PE, followed by the eight bit DIP switch address, followed by an odd parity bit PO, followed by an activity bit A, which goes to zero (0) as an indication of activity.

Referring to smart polling protocol SP4, the identifier bits 100 are followed by the 8 bit DS address, followed by an even parity bit PE, followed by the 22 bit S/N address, followed by an odd parity bit PO, followed by an activity bit A, which goes to zero (0) as an indication of activity.

Referring to smart polling protocol SP5, the identifier bits 111 are followed by the ASIC 22 bit S/N address, followed by an even parity bit PE, followed by an unknown number, n, of characterization bits followed by an odd parity bit PO, followed by an activity bit A, which goes to zero (0) as an indication of activity.

Step 2: To enroll all of the products prewired and connected to the polling loop, a keypad is used to enter the proper enrollment mode and a single key is activated to start the enrollment process. During this process, the control panel uses the special S/N group global polling protocols SP1 and SP2 which perform automatic global polls of the S/Ns of a maximum of 16 products at a time, as indicated by the most significant nibble of the DIP switch zone address. Limiting the responses to the global poll to only 16 products at a time prevents overloading of the Vplex driver circuits independent of the total number of products on the polling loop.

For each of the unique S/Ns thus obtained, the system control follows with the S/N unit poll SP3 to receive from each product the associated DIP switch pre-wired zone address. In this way the control automatically enters all of the unique S/Ns and their associated basic zone numbers into its data base.

The time required to get the S/N and its associated DIP switch zone number per product is approximately 0.1 second based on the Vplex tri-level polling baseband operating at the nominal speed of I kilobaud. A maximum system of 255 products will take less than 26 seconds to complete the S/N and associated zone number database of all the products pre-wired on the polling loop. This is less than the time it now takes to manually enter the zone number and S/N for a single product.

Automatic Identification of Duplicate Addresses

If more than one product was mistakenly assigned the same DIP switch zone address, they can be easily identified and enunciated, or logged, by the control from the unique associated S/N address per device, by using the SP3 poll since only 1 DIP switch address is allowed per unique S/N.

Conversely, in the extremely rarer case where a S/N is duplicated in more than one product, either a S/N contention error will occur during the SP2 and SP3 polls for a given group of 16 products, or different DIP switch addresses will result in the same S/N, using subsequent SP4 polls within that same group of 16 products. In either case, the control can eventually identify the DIP switch addresses which return the same S/N by the SP4 poll.

Recognizing Product Type

In addition to a unique factory-generated S/N, the plug and play S/Ns contain information describing the product type, such as; smoke, motion, shock or glass break detector; single or multiple input device; single or multiple output device; etc. This information enables the control S/W (software) to employ special commands as may be appropriate to the product type via individual or broadcast commands. For example, all of the motion detector products connected to the loop, may be commanded not to respond to global polls to eliminate unnecessary processing by the control when the system is disarmed, and to make them all respond to global polls for fastest response when the system is armed.

Step 3: The final step is to gather the necessary characterizations, or attributes, associated with each zone such as response type, partition number, report code, etc. This can be obtained via a computer download operation using the control's telephone connection. The download routine can contain all of the necessary attributes for the given site that was previously determined prior to the procurement and wired installation of the products devices. No further manual entries would then be required by the installer.

If the computer download operation is not available, a manual entry procedure can be used to obtain the attributes for each protected point in the polling loop system. To facilitate this process, the following menu-driven method is suggested.

Following the automatic gathering of S/Ns and zone numbers into the control's database in Step 2, another single key is activated by the installer to cause the control to display the first basic zone number. The basic zone number is identical to the DIP switch address. For Vplex products with more than a single protective loop input that is to be actively used in the system, the installer will be sequentially prompted for zone number extensions of the basic DIP switch zone address for each of the additional inputs, or outputs, to be enrolled in the system.

FIG. 2 illustrates a sample database enrollment table which the control can utilize. In this sample table, the Zone number consists of the DIP switch address and the actual input or output associated with that Zone number. An (X) in a box represents location of a logic level indicating the state of that box. The INO, tri-level, input is represented by a (XX) because two bits are required to represent the state of a (supervised) tri-level input. A (-) in a box represents a non-selection, which will always be transmitted as a logic 0. A blank box indicates that the associated input or output is not available for zone assignment for the given product type. Blank box status bits will also be transmitted as logic 0.

For each applicable zone number, the installer is subsequently prompted to enter the corresponding zone response type, partition number, etc. by depressing an appropriate single (Yes/No) key response per prompt. This continues in sequence until all of the required attributes are entered to complete the attributes for that zone. The process continues until all of the newly enrolled protected points have been thus characterized and completely enrolled into the system control.

The present invention combines DIP switch and S/N addressing in a method of installing a complete polling loop system, with modified Vplex products and control S/W, combining the advantages of DIP switch and Plug and Play (PnP) SIN addressing per product.

If desired, the associated S/N per product may also be displayed as part of the menu-driven characterization process.

It should be noted that the above plug and play installation method essentially eliminates the need to generate and affix a factory-printed label of the unique S/N to each Vplex product since the S/N is no longer required to be entered during the enrollment process. This provides a cost reduction that can reduce, or eliminate, the offsetting cost of the DIP switch per product.

The above process applies to Vplex products which incorporate 8-bit DIP switches and ASICs modified with new smart protocols. This includes products large enough to incorporate the 8-bit DIP switch, such as smoke, motion, shock, glass break, multiple input/output products, etc. Standard surface and recessed contacts can be wired to protected inputs of a variety of multiple input products.

A miniature plastic case containing a DIP switch and a SIM (Serial Input Module) circuit can be made with SIM flying leads to replace the existing shrink tubing version. Some present products, such as the Vplex smoke and motion detectors, already contain DIP switches and require only a change to the modified ASICs.

The modified ASICs will resort to standard S/N addressing and protocols by setting the DIP switch address to the two Hex nibbles, FF. The associated product is then backward compatible to commercial systems utilizing the present Vplex protocols.

Security System Diagnostics

The modified Vplex ASIC can include unit poll protocol SP5, which can be used by the system control to read certain factory-configured characterization bits contained in every ASIC associated with each model product. These bits describe product information such as product type, active inputs and outputs, and Power-On conditions. The number of required bits is large enough to select additional product information from the database such as the polling loop power requirements, production and revision dates, and other information which can be useful in diagnosing the quality of a given Vplex polling loop installation.

FIG. 3 illustrates an exemplary polling loop which can use the present invention in a security system 30 in which a central controller 32 is coupled to three serially addressed devices 34 via a two-wire polling loop 36. In general, the devices 34 need not be identical provided they utilize the same communications module to communicate along the polling loop. Thus, the serially addressed device can be placed within devices utilized in a multi-point security system, for example. These devices can be contact switches, key switches, keypads, PIR detectors or smoke detectors, for example.

While several embodiments and variations of the present invention for a method and apparatus for a plug and play polling system are described in detail herein, it should be apparent that the disclosure and teachings of the present invention will suggest many alternative designs to those skilled in the art.

What is claimed is:

1. A method for a plug and play polling loop system comprised of a plurality of product devices such as sensors in different zones of the polling loop system which are controlled by a system control, comprising:

prewiring all of the product devices to the polling loop, wherein during installion a zone address for each product device, which is derived from a polling loop site plan, is set by a person installing the device by setting an n-bit DIP switch;

enrolling all of the prewired product devices connected to the polling loop, during which the system control uses serial number (S/N) group global polling protocols for global polls of the S/Ns of a number of product devices at one time;

for each of the unique S/Ns thus obtained, the system control follows with a S/N unit poll to receive from the product its associated zone address, such that the control automatically enters all of the unique S/Ns and their associated zone addresses into its data base.

2. The method of claim 1, wherein following the S/N unit poll, further including gathering characterizing attributes associated with each zone address such as response type, partition number, reporting code, etc.

3. The method of claim 1, wherein the number of product devices is a maximum number of product devices at one time as indicated by the most significant nibble of each zone address.

4. The method of claim 1, including using an 8-position DIP switch for setting of the zone address.

5. The method of claim 4, wherein the setting of the 8-position DIP switch to the hex code FF causes the polling loop device to respond to standard SIN addressing in order to be backward compatible to commercial systems utilizing present protocols.

6. The method of claim 4, including dividing the 8-position DIP switch into two 4-bit sections comprising two nibbles of a Hex code per zone number, such that the product requires only a single 16-row address table which can be referred to for each hex code position comprising the zone number in Hex from 00-FE.

7. The method of claim 2, wherein the step of gathering additional information per zone is performed by a computer download routine operation over a control telephone connection.

8. The method of claim 7, wherein the computer download routine includes all of the necessary attributes for the site plan that were previously determined prior to the wired installation of the product devices.

9. The method of claim 1, including using a keypad to enter an enrollment mode to start an enrollment process.

10. The method of claim 2, wherein the step of gathering is performed by a menu-driven manual entry procedure.

11. The method of claim 1, performed in a 2-wire polling loop.

12. The method of claim 1, performed in a 2-wire Vplex polling loop.

13. A plug and play polling loop system comprising:

a plurality of product devices such as sensors connected to different zones of the polling loop which are controlled by a system control, wherein each product device is prewired to the polling loop and includes an n-bit DIP switch which is set to a zone address for each product device, which is derived from a polling loop site plan;

the system control includes serial number (S/N) group global polling protocols which are used for global polls of the S/Ns of a number of product devices at one time, to enroll all of the prewired product devices connected to the polling loop;

the system control further includes a S/N unit poll which is used to receive from a product, by its unique S/N previously obtained, its associated zone address, such that the control automatically enters all of the unique S/Ns and their associated zone addresses into its data base.

14. The system of claim 13, wherein the system control further includes a gathering attributes unit poll which is used for gathering characterizing attributes associated with each zone address, such as response type, partition number, reporting code, etc.

15. The system of claim 13, wherein the serial number (S/N) group global polling protocols are used for global polls of the S/Ns of a maximum number pf product devices at one time as indicated by the most significant nibble of each zone address.

16. The system of claim 13, wherein the DIP switch comprises an 8-position DIP switch.

17. The system of claim 16, wherein the 8-position DIP switch is divided into two 4-bit sections comprising two nibbles of a Hex code per zone number, such that the product requires only a single 16-row address table which can be referred to for each hex code position comprising the zone number in Hex from 00-FE.

18. The system of claim 14, wherein a control telephone connection allows the gathering attributes unit poll to be performed by a computer download routine operation.

19. The system of claim 13, wherein the system control includes a keypad which is used to enter an enrollment mode to start an enrollment process.

20. The system of claim 14, wherein the attributes gathering unit poll includes a menu-driven manual entry procedure.

21. The system of claim 13, in a 2-wire polling loop.

22. The system of claim 13, in a 2-wire Vplex polling loop.

* * * * *